United States Patent [19]

Fujita

[11] Patent Number: 4,771,636
[45] Date of Patent: Sep. 20, 1988

[54] TRANSMISSION APPARATUS

[75] Inventor: Yasushi Fujita, Ehime, Japan

[73] Assignee: Iseki & Co., Ltd, Matsuyama, Japan

[21] Appl. No.: 49,962

[22] Filed: May 15, 1987

[30] Foreign Application Priority Data

Jun. 4, 1986 [JP] Japan .................................. 61-130496

[51] Int. Cl.⁴ ............................................. F16H 3/08
[52] U.S. Cl. ......................................... 74/371; 74/372
[58] Field of Search ................. 74/371, 372, 359, 361, 74/366, 369, 331

[56] References Cited

U.S. PATENT DOCUMENTS

| | | | |
|---|---|---|---|
| Re. 32,125 | 4/1986 | Von Kaler et al. | 74/371 |
| 1,109,305 | 9/1914 | Rogers | 74/371 |
| 1,451,722 | 4/1923 | Valentine | 74/371 |
| 2,013,586 | 9/1935 | Semery | 74/371 |
| 2,273,807 | 2/1942 | Woytych | 74/371 |
| 2,807,340 | 9/1957 | Butterworth | 74/372 X |
| 3,527,113 | 9/1970 | Detra et al. | 74/371 |
| 3,600,962 | 8/1971 | Ivanchich | 74/371 X |
| 3,812,735 | 5/1974 | Von Kaler et al. | 74/371 |
| 4,662,241 | 5/1987 | Edwards | 74/371 X |

FOREIGN PATENT DOCUMENTS 2148419  5/1985  United Kingdom ................. 74/371

*Primary Examiner*—Leslie A. Braun
*Assistant Examiner*—David Novais
*Attorney, Agent, or Firm*—Browdy and Neimark

[57] ABSTRACT

A transmission apparatus includes a straight input shaft, a first group of large and small gears rigidly mounted on the input shaft and adapted to turn with the shaft, a straight transmission shaft installed near and parallel to the input shaft; a second group of large and small gears rotatably mounted on the transmission shaft, the sizes of the gears being in opposite relationship with those of the gears in the first group on the input shaft, a third gear rigidly mounted on the transmission shaft, a back gear rotatably mounted on the transmission shaft, partition rings installed between each of the gears in the second group, the third gear, and the back gear with no gap between the partition rings and the gears, and engagement grooves in the second group formed in the internal surface of the gears the third gear and the back gear. The engagement grooves are separated from each other by the partition rings. An axially extending speed change groove is formed in the surface of the transmission shaft and an axially movable speed change claw is installed in the speed change groove. When the speed change claw, engages with the engagement groove formed in the internal surface of the gears in the first group of gears and the back gear, the transmission shaft is driven and, when it engages with the engagement groove formed in the internal surface of the third gear, i.e. in the neutral position, the transmission shaft is not driven.

3 Claims, 3 Drawing Sheets

TRANSMISSION APPARATUS

FIELD OF INDUSTRIAL APPLICATION

The present invention relates to a transmission apparatus used on general vehicles and moving agricultural machines.

PRIOR ART

In the conventional transmission apparatus, a straight input shaft has a train of large and small gears fixed thereto which rotates with it. A linear transmission shaft is provided parallel to and near the input shaft and has a group of large and small gears rotatably mounted thereon, with the gear sizes being in opposite relation to the group of gears on the input shaft. These two groups of gears are engaged with each other. A speed change claw is provided between the transmission shaft and the gear train on the shaft to selectively bring a desired gear into engagement with the transmission shaft.

PROBLEM THE INVENTION IS INTENDED TO OVERCOME

There is a time when the speed change claw must be set to a neutral position in which no gears are engaged with the transmission shaft in order to cut off the transmission of engine power to the drive axles. The conventional apparatus has a dedicated neutral position with no gear installed, and the neutral condition where no engine power is transmitted is achieved by setting the speed change claw in the dedicated no-gear neutral position.

However, provision of the dedicated neutral position results in an increase in the width of the apparatus. As an idea of eliminating the dedicated neutral position has not come to anybody's mind, the conventional apparatuses, without exception, have the dedicated no-gear neutral postiion and therefore have a large width.

It is, however, possible to eliminate the dedicated no-gear neutral position by the following method.

OBJECT OF THE INVENTION

The object of this invention is to reduce the width of the transmission apparatus by eliminating the dedicated neutral position where no gear is installed. Other associated advantages can also be achieved by this invention.

BRIEF DESCRIPTION OF THE INVENTION

PREFERRED EMBODIMENT

Figure 1:
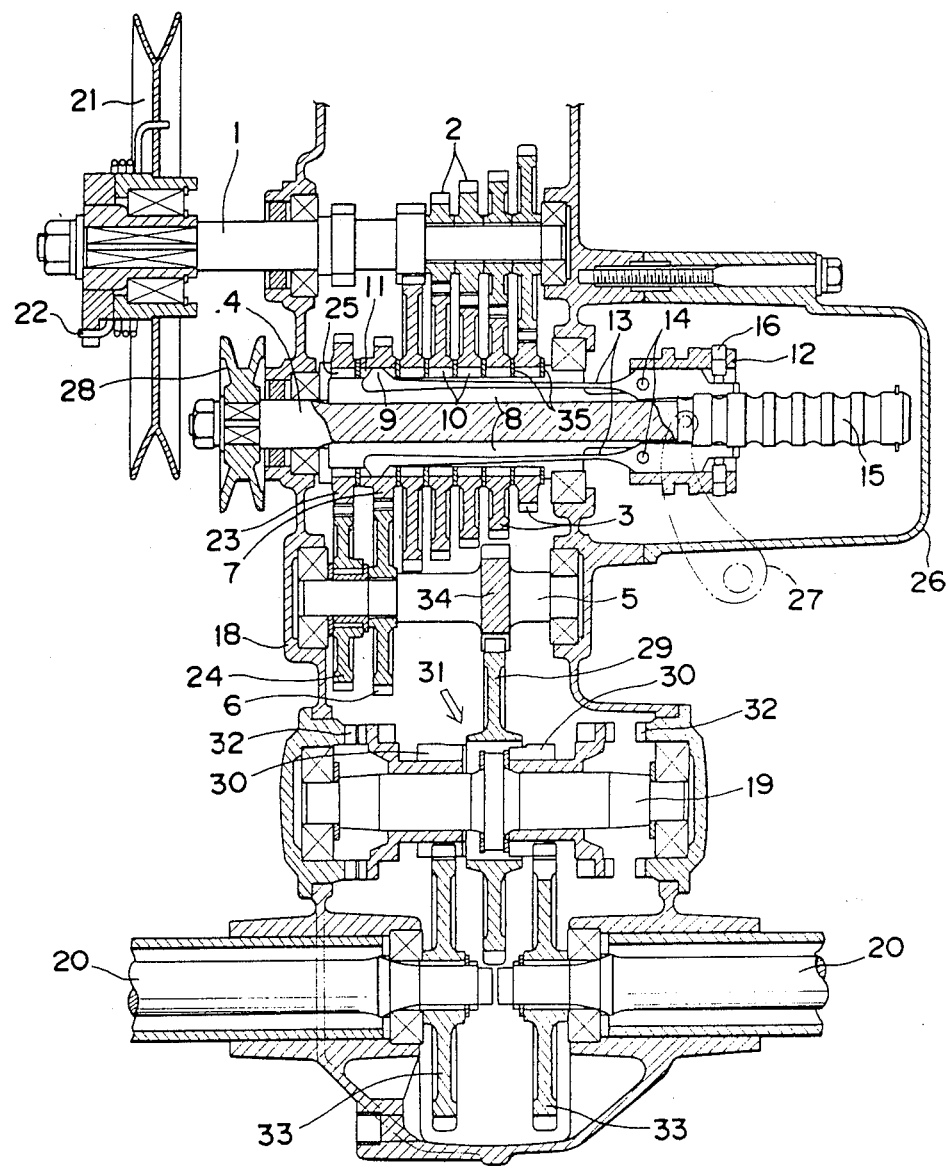
FIG. 1 is a cross section of an embodiment of the present invention.
Figure 2:
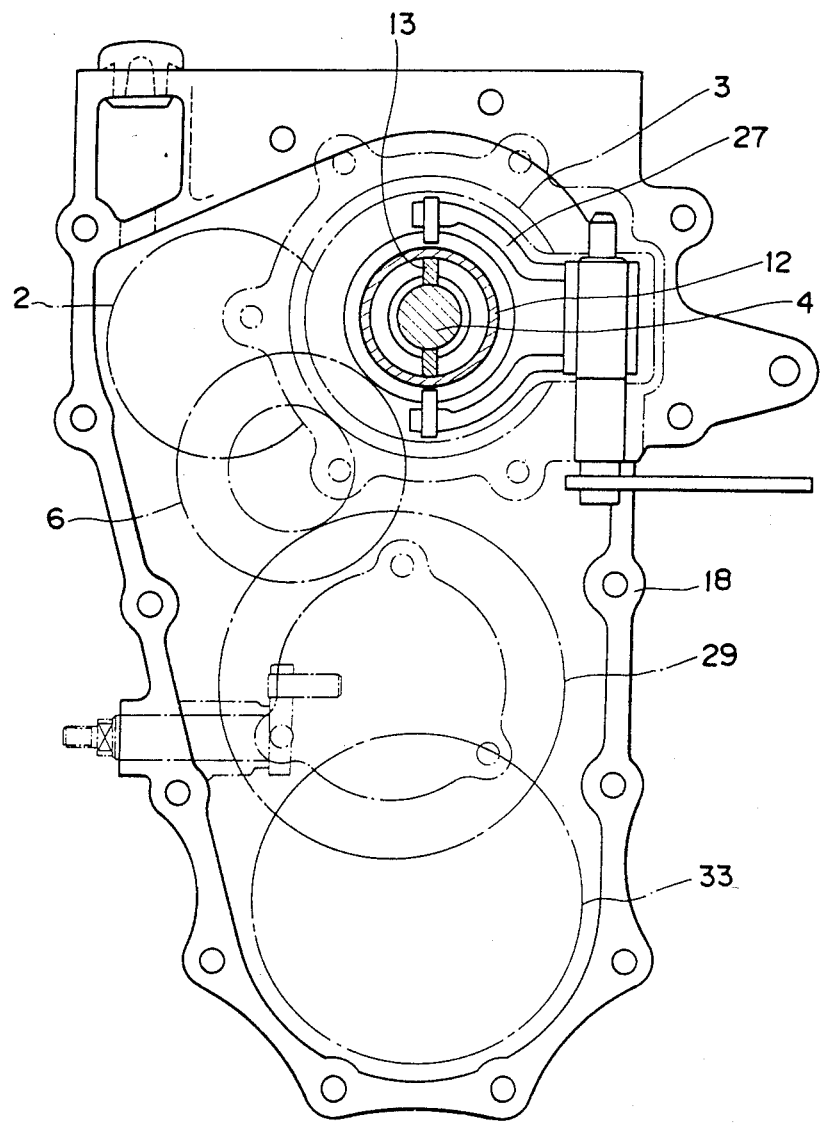
FIG. 2 is a vertical cross section of the same embodiment as seen from the side.
Figure 3:
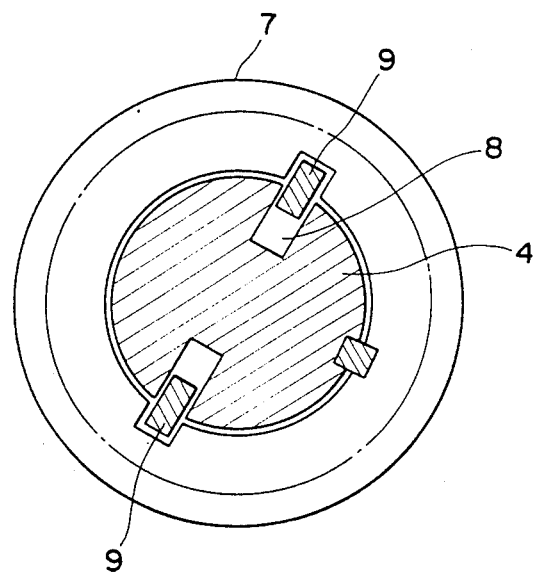
FIG. 3 is a partial enlarged cross section showing the transmission shaft and the gear in coupled condition.

One embodiment of this invention is described in the following referring to the attached drawings. A transmission case 18 rotatably supports, from top to bottom, an input shaft 1, a transmission shaft 4, an idler shaft 5, a direction clutch shaft 19 and a pair of right and left drive shafts 20.

The straight input shaft 1 is rigidly mounted with a group of large and small gears 2 that rotates with the shaft. The external end of the input shaft 1 projecting from the transmission case 18 is rigidly mounted with an input pulley 21 through a shock absorbing spring 22.

The input pulley 21 is connected to a drive pulley installed on the engine side through a belt running between the pulleys.

The straight transmission shaft 4 parallel to the input shaft 1 has on its periphery two axially extending transmission grooves 8, 8 spaced 180° apart, shaped like a key slot, in which is installed a speed change claw arm 13 with a speed change claw 9 formed at its end.

The transmission shaft 4 has rotatably supported thereon a group of large and small gears 3 whose sizes are in opposite relation to those of the gears 2 on the input shaft 1. The transmission gears 2 and the transmission gears 3 are in mesh at all times. At the side of the transmission gear train 3 is situated a gear 7 which is rigidly secured to the transmission shaft 4. A back gear 23 is rotatably mounted on the transmission shaft 4 at the side of the gear 7.

It is noted here that a dedicated neutral position where no gear is installed is not provided.

The gear 7 is in mesh with a gear 6 rigidly secured to an idler shaft 5 parallel to the transmission shaft 4. The back gear 23 is always engaged with a back idle gear 24 rotatably mounted on the idler shaft 5. The back idle gear 24 is engaged with a gear not shown rigidly mounted on the input shaft 1.

The gears of the transmission gear train 3, the gear 7 and the back gear 23 are separated from each other by partition rings 35.

Sleeved over one end of the transmission shaft 4 is a speed change operation boss 12 that can be moved axially by a speed change shifter 27. The base portion of the speed change claw arm 13 which is formed of resilient material such as leaf spring is pivotably supported at 14 on the speed change operation boss 12. The speed change claw 9 is triangular in shape and brought into selective engagement with one of the engagement grooves 10, 11, 25 formed in the internal surface of the transmission gear train 3, gear 7 and back gear 23.

At the end of the transmission shaft 4 where the speed change operation boss 12 is mounted, a plurality of circular engagement cam grooves 15 is formed. A clip ball (not shown) installed in the speed change operation boss 12 engages with one of the cam grooves 15.

The speed change operation boss 12 is fitted with adjust tools 16 which, when screwed in toward the center of the axis against the base portion of the speed change claw arm 13, causes the speed change claw 9 to project outward thus making it possible to adjust the outward pressing force of the speed change claw 9. A case 26 houses the speed change operation boss 12; and a pulley 28 is rigidly mounted at the other end of the transmission shaft 4 to derive a driving power. A direction clutch shaft 19 has a center gear 29 rotatably mounted at its center and in mesh with a gear 34 of the idler shaft 5. The direction clutch shaft also has axially slidable side gears 30 on each side of the center gear 29.

The center gear 29 and the side gears 30 form a direction clutch 31.

On the outside of the side gears 30 are provided brake teeth (reference numeral not assigned) that engage with brake teeth 32 formed integrally with the transmission case 18. The brake teeth, when the side gears 30 are moved outwardly, come into mesh with the brake teeth 32, applying brake on the direction clutch shaft 19.

The side gears 30 are engaged with running gears 33 on an all-time running shaft 20 to drive a sprocket shaft such as a crawler.

Action and Operation

An engine drives the input pulley 21 through a drive pully, rotating the input shaft 1 through a shock absorbing spring 22. As the input shaft 1 turns, the transmission gears 2 rigidly on the input shaft 1 also turn causing the transmission gears 3 in mesh with the transmission gears 2 to rotate. However, since the transmission gears 3 are rotatably or loosely mounted on the transmission shaft 4, the transmission shaft 4 is not driven.

Now, the shifter 27 is operated to move the speed change operation boss 12 along the shaft to cause the speed change claw 9 to engage with an appropriate one of the five engagement grooves 10 of the transmission gears 3. This transmits the rotation of the selected transmission gear 3 with which the speed change claw 9 engages to the transmission shaft 4 through the claw 9, thus driving the transmission shaft 4 at the selected speed (or rotation ratio).

Because the transmission shaft 4 and the gear 7 are always turning as one, the gear 6 in mesh with the gear 7 is rotated driving the idler shaft 5.

When one wants to shift the gear to the neutral position, one has only to engage the speed change claw 9 with the engagement groove 11 formed in the internal surface of the gear 7. That is, when the speed change claw 9 is brought out of engagement with the groove 10 of the transmission gears 3 or the groove 25 of the back idle gear 23, the transmission shaft 4 is released from the forward or backward driving force. In other words, the gear is in the neutral position. This is the main point of the invention.

The speed change claw 9, when driven axially, crosses the partition rings 35 coming into engagement with the adjacent engagement groove 10 or 25 of the transmission gears 3 and the back gear 23. The speed change claw 9 is held in its position and restricted of axial movement by the clip ball engaging with the engagement cam groove 15.

As to the direction clutch 31, when one of the side gears 30 is moved away from the center gear 29 and disengages from it and the other side gear 30 is brought into engagement with the center gear 29, the direction gradually changes. When a quick turn is to be made, the first side gear 30 is further moved outwardly to come into engagement with the brake teeth 32, stopping the rotation of one of the running shafts 20 (to prevent idle rotation).

Effect of the Invention

The conventional transmission apparatus has a dedicated neutral position where no gear is installed to accommodate the speed change claw in order to shift the gear into neutral.

With this invention, however, since the engagement groove 11 of the gear 7 mounted on the transmission shaft 4 is used as a neutral position, it is not necessary to provide a dedicated neutral position on the transmission shaft 4. This reduces the width of the transmission apparatus making it more compact.

I claim:

1. A transmission apparatus, comprising:
   a straight input shaft;
   a first group of gears rigidly mounted on said input shaft and adapted to turn with said shaft, each of the gears in said first group having a predetermined size;
   a straight transmission shaft installed near to and parallel with said input shaft, adapted to be moved into a first driven, non-neutral state and into a second non-driven, neutral state;
   a second group of gears rotatably mounted on said transmission shaft, each of the gears in said second group having a predetermined size in an opposite relationship with said gears in said first group of gears on said input shaft;
   a third gear rigidly mounted on said transmission shaft for driving at least one running shaft;
   a back gear rotatably mounted on said transmission shaft;
   partition rings installed between each of the gears in said second group of gears, said third gear and said back gear having no gap between said partition rings and the respective gear;
   engagement grooves formed in an internal surface of the second group of gears, said third gear and said back gear, said engagement grooves being separated from each other by said partition rings;
   an axially extending speed change groove formed on a surface of said transmission shaft; and
   an axially movable speed change claw installed in said speed change groove,
   wherein when said speed change claw engages with said engagement grooves formed in the internal surface of each of said second group of gears and said back gear, said transmission shaft is in said driven, non-neutral state, and when said speed change claw engages with said engagement groove formed in the internal surface of said third gear, said transmission shaft is in said non-driven, neutral state.

2. The transmission apparatus according to claim 1, wherein said first group of gears comprises a plurality of gears having diameters progressively ranging in size from smaller to larger, and said second group of gears comprises a plurality of gears having diameters progressively ranging in size from larger to smaller, corresponding gears of one of the groups being opposite in size with respect to the corresponding gear in the other group.

3. The transmission apparatus according to claim 1, wherein said running shaft is installed parallel to said input shaft, and said apparatus further comprises a fourth gear rigidly mounted on said running shaft, said third gear being in mesh with said fourth gear wherein when said transmission shaft rotates, the rotation of said third gear drives said running shaft via said fourth gear.

* * * * *